US010909579B1

(12) United States Patent
Huang

(10) Patent No.: US 10,909,579 B1
(45) Date of Patent: Feb. 2, 2021

(54) DETECTING VIEWABILITY AND DELIVERING CONTENT USING VIEWABILITY METRICS

(71) Applicant: Amazon Technologies, Inc., Seattle, WA (US)

(72) Inventor: Jim Huang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 270 days.

(21) Appl. No.: 15/225,006

(22) Filed: Aug. 1, 2016

(51) Int. Cl.
G06Q 30/00 (2012.01)
G06Q 30/02 (2012.01)
G06F 16/2457 (2019.01)

(52) U.S. Cl.
CPC ... G06Q 30/0275 (2013.01); G06F 16/24578 (2019.01); G06Q 30/0255 (2013.01)

(58) Field of Classification Search
CPC ............................. G06Q 10/00; G06Q 30/00
See application file for complete search history.

(56) References Cited

U.S. PATENT DOCUMENTS

| | | | | |
|---|---|---|---|---|
| 9,626,691 B2* | 4/2017 | Wang | ................. | G06Q 30/0246 |
| 2007/0088607 A1* | 4/2007 | Feierbach | .............. | G06Q 30/02 705/14.73 |
| 2007/0271511 A1* | 11/2007 | Khopkar | ............... | G06F 17/212 715/234 |
| 2009/0281889 A1* | 11/2009 | Derosa-Grund | ....... | G06Q 30/00 705/14.25 |
| 2011/0231264 A1* | 9/2011 | Dilling | ................... | G06Q 30/02 705/14.71 |
| 2014/0136344 A1* | 5/2014 | Ringdahl | ........... | G06Q 30/0273 705/14.71 |
| 2014/0280890 A1* | 9/2014 | Yi | ........................... | H04L 67/22 709/224 |
| 2015/0006280 A1* | 1/2015 | Ruiz | ...................... | G06Q 30/00 705/14.45 |
| 2015/0220235 A1* | 8/2015 | Tully | ................. | G06Q 30/0271 715/760 |
| 2015/0278877 A1* | 10/2015 | Yi | ...................... | G06Q 30/0275 705/14.71 |

OTHER PUBLICATIONS

Matthew Umbro, Pay-per-click Ads: Importance of Bid Modifiers, Jan. 28, 2014, Confluence Distribution, Inc. (Year: 2014).*
Katie Walton, Lets Talk About Bid Modifiers, Nov. 25, 2013, 3Q Digital (Year: 2013).*
MRC Viewable Ad Impression Measurement Guidelines, Aug. 18, 2015, MediaRatingCouncil.org (Year: 2015).*

* cited by examiner

Primary Examiner — Naresh Vig
(74) Attorney, Agent, or Firm — Eversheds Sutherland (US) LLP

(57) ABSTRACT

Systems, methods, and computer-readable media are disclosed for detecting viewability and delivering content using viewability metrics. In one embodiment, an example method may include receiving a bid request for an available content delivery slot, where the bid request comprises context information, determining first candidate content for the available content delivery slot, and determining a first base bid value for the first candidate content. Example methods may include determining an estimated view rate using the context information, determining a first bid modifier using the estimated view rate; and sending a response to the bid request comprising a first bid amount. The first bid amount may be based at least in part on the first base bid value and the first bid modifier.

17 Claims, 7 Drawing Sheets

DETECTING VIEWABILITY AND DELIVERING CONTENT USING VIEWABILITY METRICS

BACKGROUND

Content may be presented on electronic devices to users such that users can consume the content. Users may consume certain content while other content may not be consumed. Similarly, certain users may consume certain content, while other users may not consume the same content. Determining whether a user actually consumed content that was presented may be desirable, such that producers of content can produce effective content, and also so that certain content can be delivered to certain users that may be likely to consume the particular content. Content creators may desire to allocate resources on delivering content to users that will or will likely consume the content.

Figure 1:
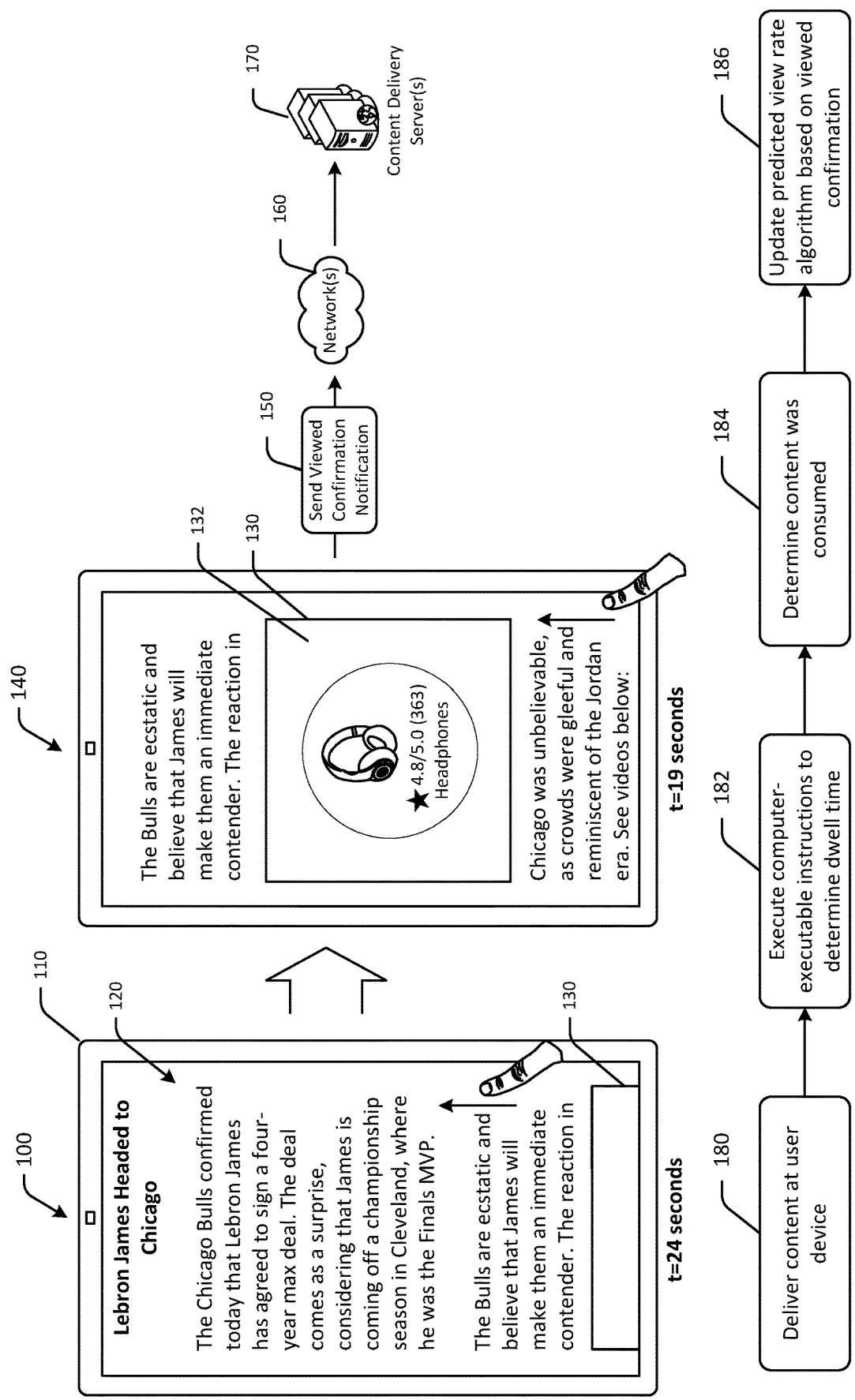
FIG. 1 is a hybrid system and process diagram illustrating detecting viewability and delivering content using viewability metrics in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users may consume the digital content. Content may be provided by content creators that desire for the content to be consumed by users. In some instances, users may not consume content, and may instead navigate away from or otherwise skip content that is presented rather than consuming the content. Content creators or other interested parties may desire to determine when content has been consumed, or when it is likely that content has been consumed, by one or more users. Campaign managers may manage delivery settings for content associated with a content delivery campaign. The content delivery campaign may include one or more pieces of content, such as different creative materials or different forms or types of content, and may be delivered or presented to users at user devices. One or more remote servers may manage delivery and/or presentation of content over the course of a content delivery campaign. Campaign managers and/or content creators may allocate resources towards the delivery of content in a content delivery campaign. In order to optimize usage or expenditure of allocated resources, content creators and/or campaign managers may desire to determine whether a user is going to consume content, or a probability that a user will consume content, before the content is delivered. Based at least in part on the determination, content creators or other parties may determine whether or not to present the content to a particular user, and may also determine an amount of resources to allocate for the delivery of the content to the user. Content creators may also implement a viewability constraint on delivery of content associated with a campaign, which may be a target or maximum expense per viewed content impression, or per content impression that is actually viewed or consumed by a user. Viewability constraints may be measured in viewable cost per mille, or in another suitable metric. In this manner, content creators may set a target or maximum value the content creator is willing to pay for delivery of content to users that will likely consume the content. Viewability constraints can be used to manage and/or optimize delivery of content for a content delivery campaign.

Embodiments of the disclosure may determine viewability constraints for a content delivery campaign, and may deliver content in accordance with applicable viewability constraints, thereby optimizing delivery of content while satisfying constraints of the content creator and/or campaign manager. Certain embodiments may monitor or otherwise track a status of cost per viewed impression over the flight time of a content delivery campaign, so as to meet viewability constraints by the end of the campaign. Using one or more predictive algorithms, certain embodiments may determine a likelihood that a certain user is going to view content prior to delivering the content. The likelihood may be converted into a binary outcome, such as a determination that the user will either view the content or not view the content. Based at least in part on the determination of whether the user will view the content, embodiments of the disclosure may adjust a bidding strategy or other applicable strategy in order to deliver and/or serve the impression to the user. The predictive algorithm used to determine whether the user will view particular content may be updated and/or modified periodically, as additional empirical data is received. For example, accuracy of the predictive model may be improved using machine learning techniques as data regarding whether or not the user actually viewed the content becomes available after delivery, compared to the initial predicted determination.

Embodiments of the disclosure may optimize content delivery campaign performance subject to viewability constraints by real-time ranking of candidate content for an available content delivery slot via the use of bid modifiers that incorporate a status of the campaign with respect to the viewability constraint (e.g., how far off is the current cost per viewed impression from the target or maximum cost per viewed impression?, etc.). Certain embodiments may periodically update bid modifiers for candidate content based at least in part on the status of the campaign, or as additional data becomes available.

This disclosure relates to, among other things, systems, methods, computer-readable media, techniques, and methodologies for detecting viewability and delivering content using viewability metrics. Embodiments may select certain available content delivery slots for submitting bids on for certain candidate content, where the amount of the bid is based at least in part on a viewability constraint associated with the candidate content. Over the flight time of the campaign, campaign effectiveness or performance may be optimized while satisfying the viewability constraint, thereby providing content creators with a fixed cost or maximum cost per viewed impression that can be set prior to delivery of content or initiation of a content delivery campaign. By predicting whether a user will consume content that may be presented, embodiments of the disclosure may enable content creators to select a viewability constraint that provides control over a target or maximum cost to the content creator per viewed impression. As a result, content delivery campaigns may be more effective and performance may therefore be improved.

Referring to FIG. 1, an example use case illustrating detecting viewability and delivering content using viewability metrics is depicted. In the example of FIG. 1, a content creator or a campaign manager may set up or initiate a content delivery campaign. The content creator may indicate a viewability constraint for the content delivery campaign. For example, the content creator may indicate that a cost per viewed impression of content associated with the content delivery campaign is not to exceed $5. Additional constraints, such as budgetary and/or targeting constraints may also be set for the content delivery campaign. The content delivery campaign may be initiated.

To deliver content associated with the content delivery campaign, one or more content delivery servers 170 may communicate with one or more remote servers, such as ad exchange servers, publisher servers, and other servers, to serve content impressions in available content delivery slots. Available content delivery slots may be locations on digital content at which content can be delivered, such as locations on a webpage, positions within a mobile app (e.g., banner slots, interstitial slots, popup slots, pop-under slots, etc.), or other suitable locations where digital content can be presented. In one example, an available content delivery slot may be available when a user is browsing digital content with a location that is available for content to be presented. To determine what content is to be presented in that available content delivery slot, an auction may be conducted, where content associated with a highest bid may be given an opportunity to serve an impression in the available content delivery slot. To determine a bid amount for a particular available content delivery slot, a predicted view rate indicating a likelihood that the user will view or otherwise consume the content may be determined. The determination may be binary, a probability value, or another suitable metric. Based at least in part on the predicted view rate, a bid amount may be determined for particular content.

For example, in FIG. 1, a user may be browsing digital content 120 at a first user interface 100 on a user device 110. The digital content 120 may be a news article or other content. The user may manipulate or scroll through the digital content 120. An available content delivery slot 130 at which a content impression can be served may be available in the digital content 120. For example, the user may scroll through the digital content 120, and at a second user interface 140, the available content delivery slot 130 may appear. To determine what content to present at the available content delivery slot 130, an auction may be conducted. The auction may be conducted at any time, for example, prior to the user scrolling to the second user interface 140. The auction may include receiving a bid request for the available content delivery slot 130. The bid request may include contextual information, such as user attributes for the user, chronological information, geographic location information, time of day, contextual information for the content around the available content delivery slot, and other contextual information. Based at least in part on the bid request, a set of one or more candidate content may be determined. Candidate content may be determined from content that is available for potential delivery. In some instances, candidate content may be based at least in part on targeting criteria associated with respective content. For example, targeting criteria for certain content may indicate that the user for which the content delivery slot is available does not match the targeting criteria, and as a result, the content may not be candidate content for that particular content delivery slot. User information, in this example, may be determined based at least in part on context information and/or other information associated with the bid request.

Base bid values may be determined for candidate content. Base bid values may be values that can be submitted in response to the bid request. Base bid values for candidate content may be determined in any suitable manner. In one example, base bid values may be determined for candidate content based at least in part on an expected value or a value that can be expected from presenting an impression of particular content in the available content delivery slot. Factors such as campaign performance, pacing, budget or budget consumption status, and other factors may be used to determine base bid values.

A bid modifier may be determined for one or more of the candidate content. Bid modifiers may be a value that adjusts the base bid for particular content. Bid modifiers may be positive or negative. Bid modifiers may be used to correct a trajectory of a content delivery campaign with respect to one or more constraints. For example, if a content delivery campaign has a viewability constraint of $3 maximum per viewed impression, and the campaign is currently at a value of $4 per viewed impression, a bid modifier for content associated with that campaign may be negative, so as to bring the cost per viewed impression downwards, or closer to the viewability constraint.

For content associated with a viewability constraint, bid modifiers may be based at least in part on a likelihood that the content impression will be viewed or consumed. A predicted view rate may be determined, which indicates whether or not, or a likelihood, a user will view or consume the content impression. The predicted view rate may be determined using one or more algorithms and may be based at least in part on the bid request and/or context information.

In some embodiments, bid modifiers may be equal to, or a function of, a shadow price, or a price that is indicative of a cost/benefit of serving additional content impressions when the actual cost per viewed impression does not align with the viewability constraint. Shadow pricing may represent a maximum price for an additional content impression and may be related to a perceived benefit that may be obtained from the additional content impression.

Certain candidate content may be associated with one or more bid modifiers. For example, first candidate content may be associated with a viewability constraint, and thus a bid modifier based at least in part on the viewability constraint may be determined. Other candidate content may be associated with constraints such as budget constraints, pacing constraints, and other constraints, and bid modifiers for such candidate content may be determined accordingly.

Adjusted bid values based at least in part on the base bid value and the respective bid modifiers for one or more, or each, of the candidate content may be determined. The adjusted bid values may be sorted, and the candidate content may be ranked based at least in part on the respective adjusted bid values. Candidate content associated with the highest ranked adjusted bid value may be determined. A response to the bid request may be submitted for the candidate content associated with the highest ranked adjusted bid value. The response to the bid request may include a bid amount, which may be the adjusted bid value for the highest ranked candidate content.

After submitting the response to the bid request, a notification may be received indicating that the bid amount was a winning bid amount. The notification may indicate that an impression of the content may be served at the available content delivery slot. Delivery and/or presentation of an impression of the content may be facilitated.

In the example of FIG. 1, first candidate content 132 may be associated with a viewability constraint. An auction may be conducted for the available content delivery slot 130. The content delivery server 170 may receive a bid request for the auction, and may determine candidate content for the available content delivery slot 130. The content delivery server 170 may determine base bid values for the candidate content, as well as applicable bid modifiers. For example, the first candidate content 132 may be associated with a viewability constraint. To determine a bid modifier for the first candidate content 132, the content delivery server 170 may determine a probability that the user of the user device 110 will view the first candidate content 132 impression if presented. The determination may be based at least in part on the bid request and/or context information. The determination may be output as a binary output, a percentage output, a probability output, or another suitable metric.

After or while determining base bid values and any bid modifiers for candidate content, the candidate content may be ranked by base bid values and/or adjusted bid values to determine a highest ranked, or top ranked, bid. A response to the bid request may be submitted for the candidate content associated with the highest ranked bid. The bid amount may be equal to the base bid value or the modified bid value in the instance of bid modifiers.

In FIG. 1, the first candidate content 132 may be the top ranked bid. For example, the base bid value for the first candidate content 132 may be $2.55, and a bid modifier may be +$0.44, for an adjusted bid value of $2.99. The bid modifier may be determined based at least in part on the likelihood that the user of the user device 110 will consume the impression of the first candidate content 132. For example, the user may meet some or all of targeting criteria or may be a strong match with respect to targeting criteria for the candidate content. As a result, a likelihood that the user will consume the content may be relatively higher than for content where the user may not meet certain targeting criteria. In some embodiments, a probability that the user will view the content impression may be determined. The probability may be used to determine a binary output of whether or not the user will view content. For example, a probability of 50% or greater may indicate that the user will view the content, while a probability of less than 50% may indicate that the user will not view the content. Probability thresholds (e.g., greater than or equal to 70% indicates the user will view, etc.) may be set and/or modified based on any number of factors, including a delivery schedule, pacing indicator, and other factors. Using the probability and/or determination of whether the user will view the content, a bid modifier may be determined. The bid modifier may be represented as an amount by which a base bid value is increased or decreased in light of, in one example, a viewability constraint associated with certain content.

The base bid value for the first candidate content 132 in addition to the bid modifier for the first candidate content 132 may be the top ranked bid, and as a result, a response to the bid request for the available content delivery slot 130 may be submitted with a bid amount that may be equal to the base bid value and the bid modifier. The response to the bid request may include additional information, such as a content identifier that identifies the first candidate content 132, or other information. An auction and/or second-price auction process may be conducted to determine a winning bid for the available content delivery slot 130. A winning bid notification may be sent by the server or other computer system(s) at which the auction process is conducted.

The bid amount submitted in FIG. 1 may be a winning bid. The content delivery server 170 may therefore receive a winning bid notification. The winning bid notification may indicate that the first candidate content 132 may be presented at the available content delivery slot 130. At block 180 of the process flow illustrated in FIG. 1, the content delivery server 170 may deliver content at the user device 110. The content delivery server 170 may send or may initiate sending of the first candidate content 132 to the user device 110 for presentation or rendering at the available content delivery slot 130. The user device 110 may receive the first candidate content 132, or a content identifier associated with the first candidate content 132, and may render the first candidate content 132.

For example, as the user navigates to the second user interface 140, the first candidate content 132, which may include headphone information, such as images, videos, user ratings, and other information, may be rendered in the available content delivery slot 130. The first candidate content 132 may be any suitable digital content.

When or after the first candidate content 132 is rendered, a determination may be made as to whether the user consumed or viewed the first candidate content 132. The determination may be made locally, for example via execution of JavaScript or other computer-executable instructions at the user device 110, via the content delivery server 170, via a combination of the content delivery server 170, or via another computer system. At block 182 of the process flow, computer-executable instruction may be executed to determine a dwell time. In one example, the user device 110 may determine whether the user consumed the first candidate content 132. The user device 110 may determine a dwell time of the user when the first candidate content 132 is rendered on a display of the user device 110. Dwell time may be a length of time that a user spends on a certain portion of content. Dwell time may be used as an indicator of whether or not a user consumed certain content. The user device 110 may use dwell time in addition to other metrics, such as a position of the first candidate content 132 on the display (e.g., was the first candidate content 132 positioned at a central location on the display? At an edge location? etc.), whether the first candidate content 132 was fully presented on the display, or if a portion of the first candidate content 132 was presented, and the like. A number of rendered pixels may be used to determine what portion of the first candidate content 132 was rendered at a certain time, and pixel location may be used to determine location on the display of the first candidate content 132. In some embodiments, determinations may be made at the content delivery server 170 instead of at the user device 110. For example, the user device 110 may be under the control of the content delivery server 170, or may send information to the content delivery server 170 in order to determine whether the user consumed the first candidate content 132.

In FIG. 1, the user device 110 may determine that the user consumed the first candidate content 132. For example, the user device 110 may determine a first dwell time of the user at the first user interface 100 of 24 seconds, and a second dwell time of the user at the second user interface 140 of 19 seconds. Based at least in part on the second dwell time, the user device 110 may determine that the user viewed the first candidate content 132. In some embodiments, a dwell time comparison may be used to determine whether the user consumed certain content. For example, a number of words presented at the first user interface 100 may be compared to a number of words presented at the second user interface 140, as well as a comparison of the respective dwell times. If the number of words is significantly less at the second user interface 140, but the dwell times do not reflect the difference in words, it may be likely that the user spent time consuming the first candidate content 132. Due to the relatively high dwell time on the second user interface 140, as well as the central location of the rendered first candidate content 132, the user device may determine that the user consumed the first candidate content 132. The user device 110 may send a viewed confirmation notice at operation 150 to the content delivery server 170 via one or more networks 160. The one or more networks 160 may be wired or wireless networks, or a combination thereof. The viewed confirmation notice may indicate whether or not the user consumed the first candidate content 132.

At block 184 of the process flow of FIG. 1, the content delivery server 170 may determine that the first candidate content 132 was consumed. For example, the content delivery server 170 may receive the viewed confirmation notification from the user device 110, or the content delivery server 170 may make a determination that the content was consumed based at least in part on information received from the user device 110 or another computer system.

At block 186, the predictive view rate algorithm may be updated based at least in part on the viewed confirmation, or the confirmation that the user consumed the content. The predictive view rate algorithm may be updated periodically, such as every 20 seconds, or at predetermined time intervals. Updates to the predictive view rate algorithm may be implemented based at least in part on machine learning techniques. Updates may be based at least in part on batched data, such as based viewing data. For example, viewed confirmations over a period of 20 seconds may be compared to estimated or predicted view rates for those respective content delivery slots to determine an accuracy of the predictive view rate algorithm(s). The predictive view rate algorithm(s) may be updated to improve accuracy based at least in part on the performance of the algorithm(s) over the prior time interval or time period. For example, if the predicted view rate for available content delivery slots was 100% accurate, the predictive view rate algorithm(s) may not be modified, whereas if the accuracy was low, updates may be implemented using machine learning techniques to improve the accuracy. Over time in an iterative process, the predictive view rate algorithm(s) may converge to accurately predict whether or not a user will consume certain content.

Upon determining that the user consumed the first candidate content 132, the viewability constraint status for the campaign associated with the first candidate content 132 may be updated. For example, if the cost to serve the first candidate content 132 impression was $2.99, the cost may be factored into the average cost per view content impression for the campaign. The average cost may be compared to the viewability constraint and may be used for future bid modifiers and/or bidding strategies for content associated with the campaign.

By determining whether or not content was consumed by a user, embodiments of the disclosure may provide the ability to implement and satisfy viewability constraints, which may enable content creators or other users to execute effective campaigns and improve content campaign performance. Embodiments of the disclosure may further optimize content delivery campaign performance via the use of bid modifiers that may be determined based at least in part on a predicted view rate for a particular bid request and/or for particular content.

The systems, methods, computer-readable media, techniques, and methodologies for detecting viewability and delivering content using viewability metrics may result in improved control and effectiveness of content delivery campaigns, as well as improved and efficient use of computer resources and other allocated resources.

Example embodiments of the disclosure provide a number of technical features or technical effects. For example, in accordance with example embodiments of the disclosure, certain embodiments of the disclosure may generate predictive view rates and may generate binary determinations as to whether content will be consumed if presented. As a result, content delivery may be managed more effectively and computer resources may be utilized more efficiently, due to easier disposition of content in response to bid requests. Embodiments of the disclosure may automatically execute or cause execution of logic at user devices to make determinations of whether content was viewed or otherwise consumed, which may not require active user interaction. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
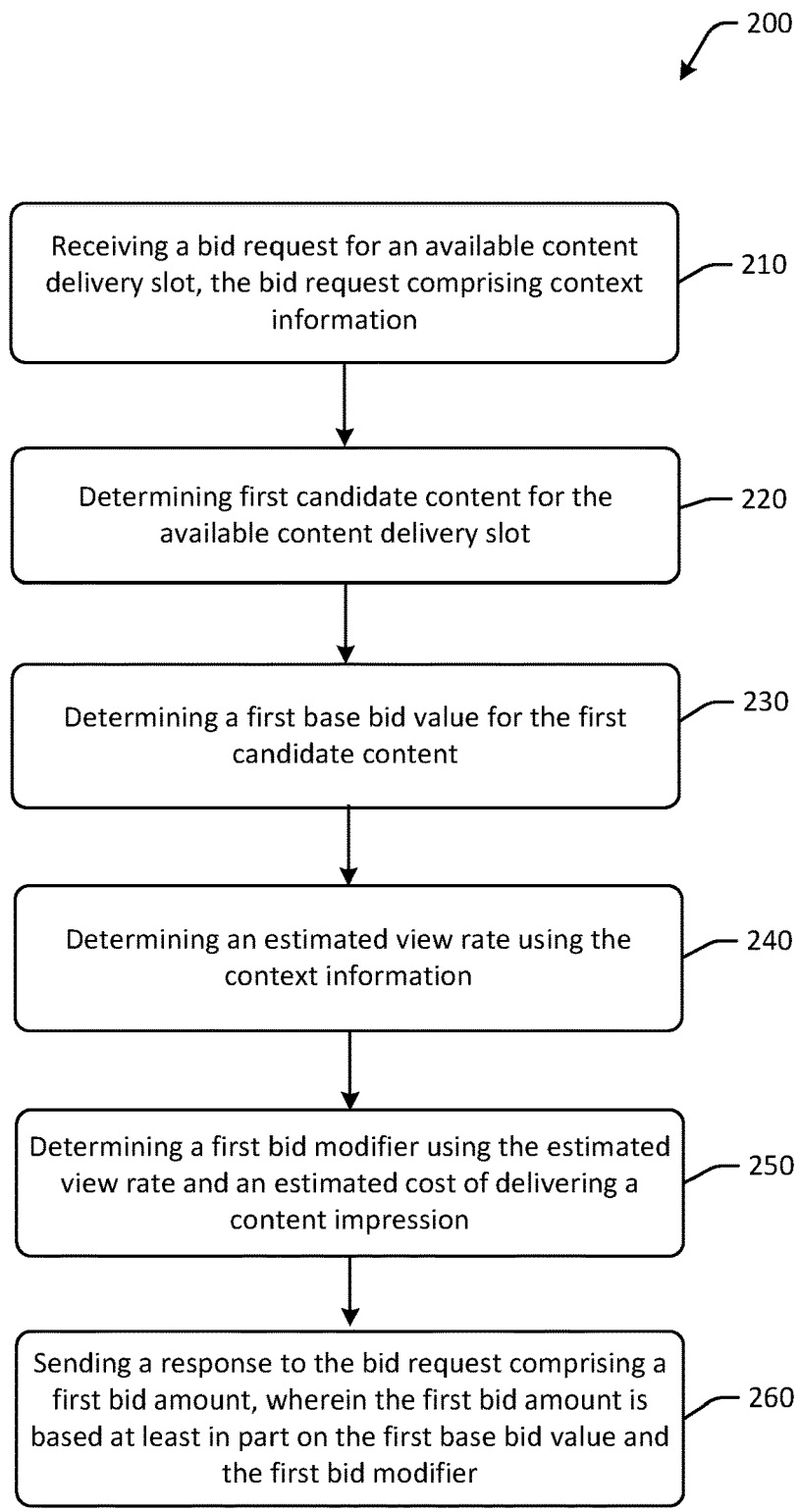
FIG. 2 is an example process flow diagram for detecting viewability and delivering content using viewability metrics in accordance with one or more embodiments of the disclosure.

Referring to FIG. 2, an example process flow 200 for detecting viewability and delivering content using viewability metrics in accordance with one or more embodiments of the disclosure is depicted. Although certain operations are illustrated as occurring separately in FIG. 2, some or all of the operations may occur concurrently or partially concurrently across one or more computer systems.

At block 210 of the process flow 200, a bid request for an available content delivery slot is received, the bid request comprising context information. For example, computer-executable instructions of one or more content delivery module(s) stored at a remote server may be executed to receive a bid request for an available content delivery slot. The bid request may include information related to the specific available content delivery slot, such as information related to the user to which the content impression will be served, website content or context, location information, chronological information, and other related information.

At block 220, first candidate content for the available content delivery slot is determined. For example, computer-executable instructions of one or more content delivery module(s) stored at a remote server may be executed to determine candidate content for the available content delivery slot. Candidate content may be selected from available content. Candidate content may include content available to the server for which the server may serve content impressions. In some embodiments, candidate content may be determined by determining targeting criteria for available content, and determining which of the available content has targeting criteria that is satisfied by the bid request. A remote server may determine that the first candidate content has targeting criteria that is satisfied by the bid request, and thus, the content is the first candidate content.

At block 230, a first base bid value for the first candidate content is determined. For example, computer-executable instructions of one or more content delivery module(s) stored at a remote server may be executed to determine a base bid value for the first candidate content. Base bid values may be determined by determining an expected value that may be received from presenting a content impression at the available content delivery slot. Expected value may be a dollar value that may be received from serving one impression of particular content. To generate or determine a base bid value, information associated with a determined quality or value of the available content delivery slot, and/or information relating to metrics or historical data associated with content that has previously been served (e.g., click-through rate, number of clicks, number of impressions, number of page views, number of associated searches, etc.) may be considered. Additional considerations in generating bid values may include bid data such as previous and/or most recent winning bid values for particular content, and/or a period of time that has elapsed since the most recent winning bid. Historical bid information may further include aggregate bid information relating to each bid value previously submitted for content regardless of whether the bid was a winning bid. Base bid values may be determined for each candidate content.

At block 240, an estimated view rate is determined using the context information. For example, computer-executable instructions of one or more predictive view rate determination module(s) stored at a remote server may be executed to determine an estimated or predicted view rate based at least in part on the context information and/or the bid request. The context information may indicate user attributes, geographic location, and other information that may be used to determine a probability that the user will consume particular content. In some embodiments, content specific information may be used to determine probability, such as targeting criteria, user preferences, and the like. The estimated view rate may be binary in that the outcome of the determination is positive or negative, or may be a numerical value that is converted to a binary value. For example, probabilities at or above a certain threshold value may be converted to positive determinations, while probabilities at or below a certain threshold may be converted to negative determinations. In some embodiments, the probability may be determined as a numerical value. An estimated view rate may be determined for a bid request and applied to all candidate content, or may be determined individually for each candidate content.

At block 250, a first bid modifier is determined using the estimated view rate. For example, computer-executable instructions of one or more content delivery module(s) stored at a remote server may be executed to determine a bid modifier for the first candidate content. Bid modifiers may be determined based at least in part on one or more of a target cost per viewed impression, estimated view rates, estimated costs associated with delivery of a content impression at an available content delivery slot, estimated revenue from delivery of a content impression, or another metric. For example, an estimated cost associated with delivery of a content impression at the available content delivery slot may be determined and used to determine a bid modifier.

The bid modifier may be a positive or negative value that may be determined based at least in part on the predicted or estimated view rate. In one example, the first bid modifier may be a function of the shadow price for the first candidate content. The bid modifier may be used to modify or adjust the base bid values for the candidate content to generate adjusted or modified base bid values. The modified base bid values may be bid amounts that may be submitted for respective content in response to the bid request.

At block 260, a response to the bid request is sent, where the response includes a first bid amount that is based at least in part on the first base bid value and the first bid modifier. For example, computer-executable instructions of one or more content delivery module(s) stored at a remote server may be executed to determine the first bid amount by combining the base bid value and the bid modifier to determine a first bid amount, and submitting the first bid amount in response to the bid request. In some embodiments, a ranking process may be completed to determine candidate content associated with the highest adjusted bid value in order to determine for which candidate content a bid should be submitted. In this example, the first candidate content may have the highest adjusted bid value, and a response to the bid request for the first candidate content may therefore be submitted.

Figure 3:
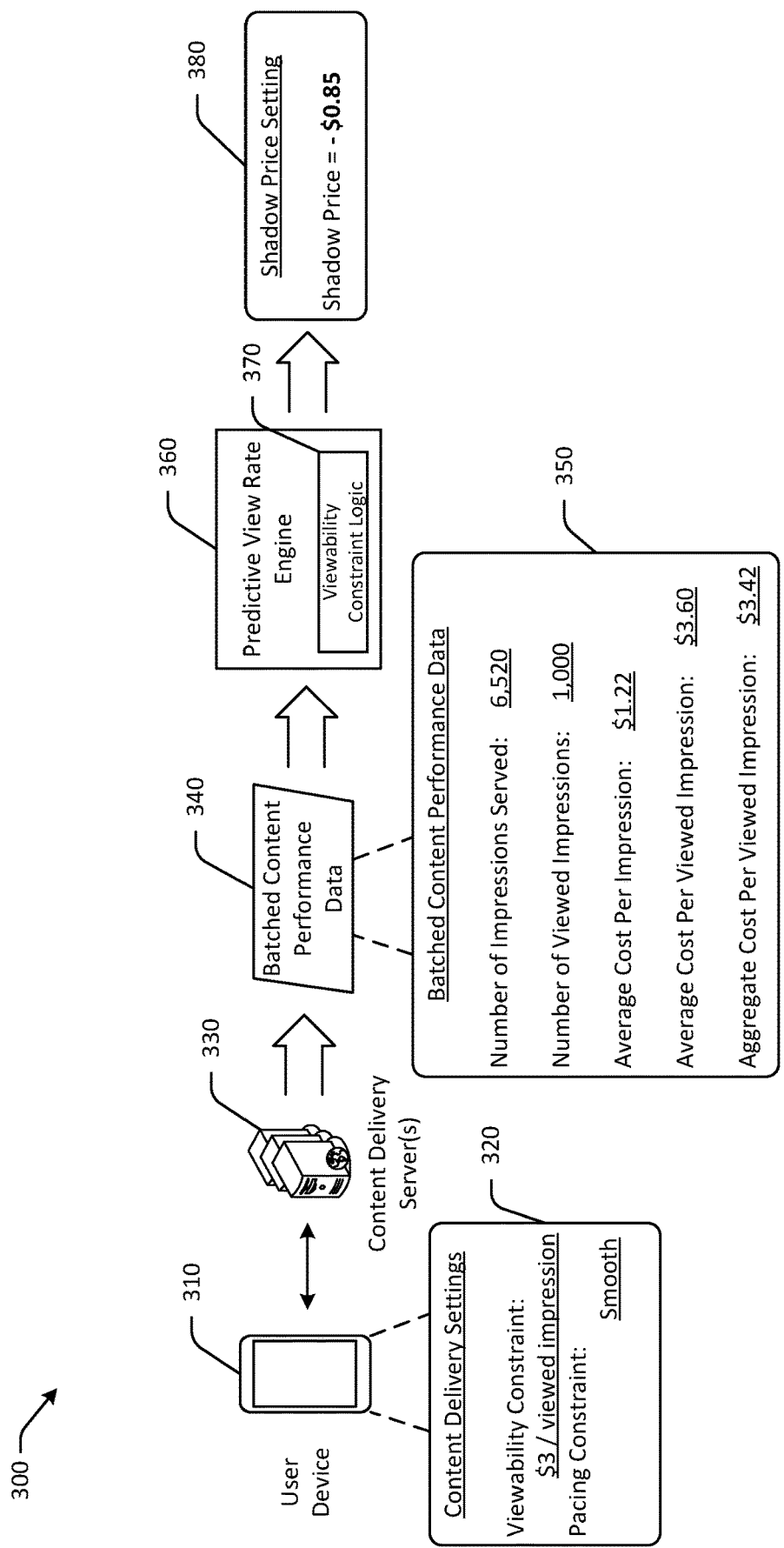
FIG. 3 is an example hybrid system and process flow diagram for determining predictive view rates in accordance with one or more embodiments of the disclosure.

FIG. 3 depicts an example hybrid system and process flow diagram 300 for determining predictive view rates in accordance with one or more embodiments of the disclosure. In FIG. 3, a user, such as a campaign manager, a content creator or provider, or another party, may initiate or set up a content delivery campaign using a user device 310. The content delivery campaign may include content delivery parameters or settings 320. The content delivery settings 320 may indicate a viewability constraint, such as a target or maximum cost of $3 per viewed impression. The viewability constraint may indicate a value that the user wishes to pay, or a maximum value that the user does not wish to exceed, per viewed impression of content associated with the content delivery campaign. The content delivery settings 320 may include additional settings, such as pacing constraints, budget constraints, and other settings.

The content delivery settings 320 may be communicated to one or more content delivery servers 330. The content delivery server 330 may determine the content campaign delivery parameters and the viewability constraint for the content delivery campaign, where the viewability constraint represents a target cost per viewed content impression. The content delivery server 330 may initiate delivery of content associated with the content delivery campaign as the campaign is initiated. To deliver impressions of the content for the content delivery campaign, an auction process may be conducted. The content delivery server 330 may receive a bid request for an available content delivery slot. The content delivery server 330 may be one of many servers that receive a bid request for the available content delivery slot. The bid request may include context information. The content delivery server 330 may determine candidate content for the available content delivery slot. For example, the content delivery server 330 may determine a set of one or more candidate content for the available content delivery slot. The set of candidate content may include first candidate content and second candidate content. The first candidate content may be content associated with the content delivery campaign in FIG. 3. The content delivery server 330 may generate base bid values for one or more, or each, of the set of candidate content. For example, the content delivery server 330 may determine a first base bid value for the first candidate content and a second base bid value for the second candidate content. The base bid values may be based at least in part on an expected value associated with the respective candidate content. The content delivery server 330 may determine bid modifiers for one or more, or each, of the candidate content. For example, the content delivery server 330 may determine that the first candidate content is associated with a content delivery campaign having a viewability constraint. The bid modifier for the first candidate content may therefore be based at least in part on a predicted view rate for the first candidate content, and/or may be based at least in part on the current status of the campaign with respect to the viewability constraint.

The content delivery server 330 may determine a predicted view rate indicative of a likelihood that the user will view or consume content if presented at the available content delivery slot. The predictive view rate may be determined by one or more predictive view rate algorithms. The predictive view rate may be used to determine the bid modifier.

The content delivery server 330 may determine a status of the campaign with respect to the viewability constraint. For example, the content delivery server 330 may determine how far off the current average cost per viewed impression is from the target cost or maximum cost per viewed impression as defined by the viewability constraint. For example, the content delivery server may determine a difference between an average cost per viewed content impression for the content delivery campaign and the target cost per viewed content impression. The bid modifier for the first candidate content may be based at least in part on the difference between the average and the target, as well as the predicted view rate.

The predictive view rate algorithm may be updated periodically or after a predetermined time interval has elapsed. Updates may include content impression performance, such as information related to whether or not specific content was consumed. Such information may be used to improve the predictive view rate algorithm via machine learning techniques.

In FIG. 3, the content delivery server 330 may determine that the adjusted bid value for the first candidate content is the highest adjusted bid value in a ranking process that ranks candidate content by adjusted bid value. The content delivery server 330 may submit a response to the bid request with the adjusted bid value for the first candidate content, and if the bid is a winning bid, the content delivery server 330 may facilitate delivery of an impression of the first candidate content in the available content delivery slot.

The predictive view rate algorithm used to determine a predicted view rate for a given content delivery slot may be modified using data. Modifications or updates to the predictive view rate algorithm may be implemented as data becomes available, such as in real-time, periodically, or after a predetermined time interval has elapsed. For example, in FIG. 3, viewed impression data may be batched as batched content performance data 340. The batched content performance data may include data 350 related to a number of impressions served during a time interval, a number of served impressions that were viewed, an average cost per impression, an average cost per viewed impression, an aggregate cost per viewed impression, and other data. For example, the average cost per impression during a time interval may be $1.22, and the average cost per viewed impression during the time period may be $3.60, which may be greater than the viewability constraint of $3 per viewed impression. The aggregate cost per viewed impression for the campaign, however, may be $3.42, which is greater than the viewability constraint.

The batched content performance data 340 may be communicated to a predictive view rate engine 360 that may utilize viewability constraint logic 370, which may include predictive view rate algorithms, to determine predicted view rates. The predictive view rate engine 360 may modify or update the predictive view rate algorithm based at least in part on the batched content performance data 340, so as to increase accuracy of the predicted view rates generated by the predictive view rate engine 360. The predictive view rate engine 360 may also generate a shadow price setting 380 for the respective content. For example, the shadow price setting for the first candidate content may be −$0.85, which may reflect the fact that the aggregate cost per viewed impression does not satisfy the viewability constraint, and as a result, bid values for the first candidate content should be adjusted downwards. Bid modifiers may be determined based at least in part on shadow prices for respective content campaigns, as well as predicted view rates, in some embodiments.

Figure 4:
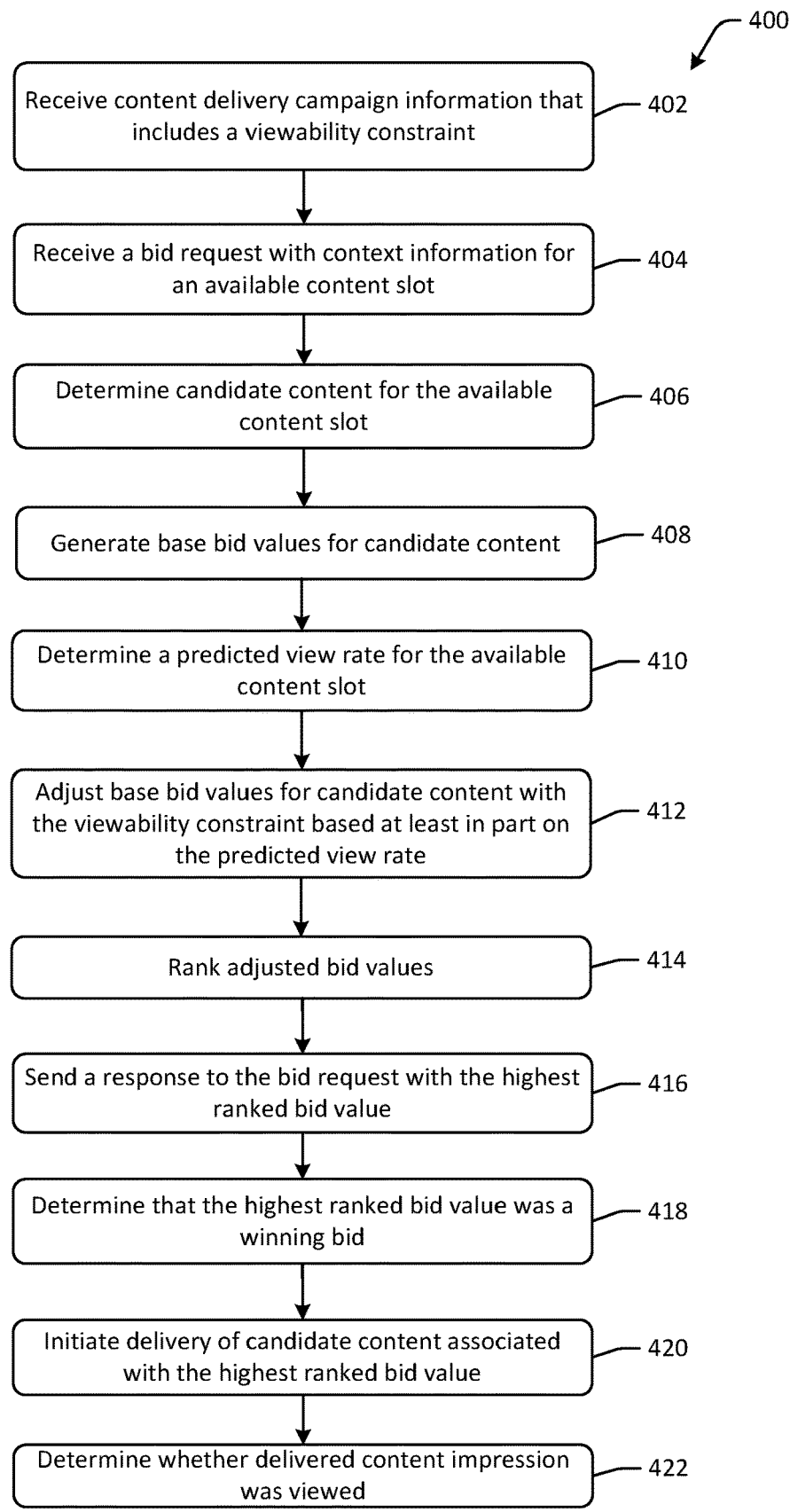
FIGS. 4-6 are example process flow diagrams for detecting viewability and delivering content using viewability metrics in accordance with one or more embodiments of the disclosure.

FIG. 4 depicts an example process flow 400 for detecting viewability and delivering content using viewability metrics in accordance with one or more embodiments of the disclosure. At block 402, a content delivery server may receive content delivery campaign information that includes a viewability constraint. A content creator or campaign manager may indicate a viewability constraint with a target or maximum cost per viewed impression that is to be implemented during delivery of content associated with a content campaign.

At block 404, the content delivery server may receive a bid request with context information for an available content slot. The bid request may request a bid for the available content slot. The context information may include information related to the available content slot, the user device at which the content impression is to be presented, user information, and/or other contextual information.

At block 406, the content delivery server may determine candidate content for the available content slot. Candidate content may be determined from available content and may be based at least in part on attributes of the available content slot, and the context information.

At block 408, the content delivery server may generate base bid values for the candidate content. Base bid values may be determined based at least in part on an expected value and/or shadow price for respective candidate content.

At block 410, the content delivery server may determine a predicted view rate for the available content slot. The predicted view rate may be specific to each candidate content, or may be specific to the bid request and/or the available content slot. The predicted view rate may be determined by a predictive view rate algorithm indicative of a likelihood that a user will consume content presented at the available content slot.

At block 412, the content delivery server may adjust base bid values for candidate content associated with the viewability constraint based at least in part on the predicted view rate. The base bid value for the candidate content associated with the viewability constraint may be adjusted by a bid modifier. The bid modifier may be an amount by which the base bid value is adjusted. The bid modifier may be determined based at least in part on the predicted view rate, an estimated cost associated with delivering a content impression at the available content slot, an estimated revenue associated with delivery of the impression, and/or the bid request and context information. Candidate content that is not associated with the viewability constraint may also be adjusted or modified in accordance with other constraints that may be applicable to the respective candidate content. In one example, the content delivery server may determine an estimated view rate using the context information, and may determine a first bid modifier using at least the estimated view rate.

At block 414, the content delivery server may rank the adjusted bid values. The adjusted bid values may be ranked in order to determine a highest adjusted bid value. The highest adjusted bid value may be determined to be a highest ranked bid value.

At block 416, the content delivery server may send a response to the bid request with the highest ranked bid value. At block 418, the content delivery server may determine that the highest ranked bid value was a winning bid. At block 420, the content delivery server may initiate delivery of the candidate content associated with the highest ranked bid value. At block 422, the content delivery server may determine whether the delivered or served content impression was viewed. The content delivery server may make the determination or may receive an indication from a user device.

Figure 5:
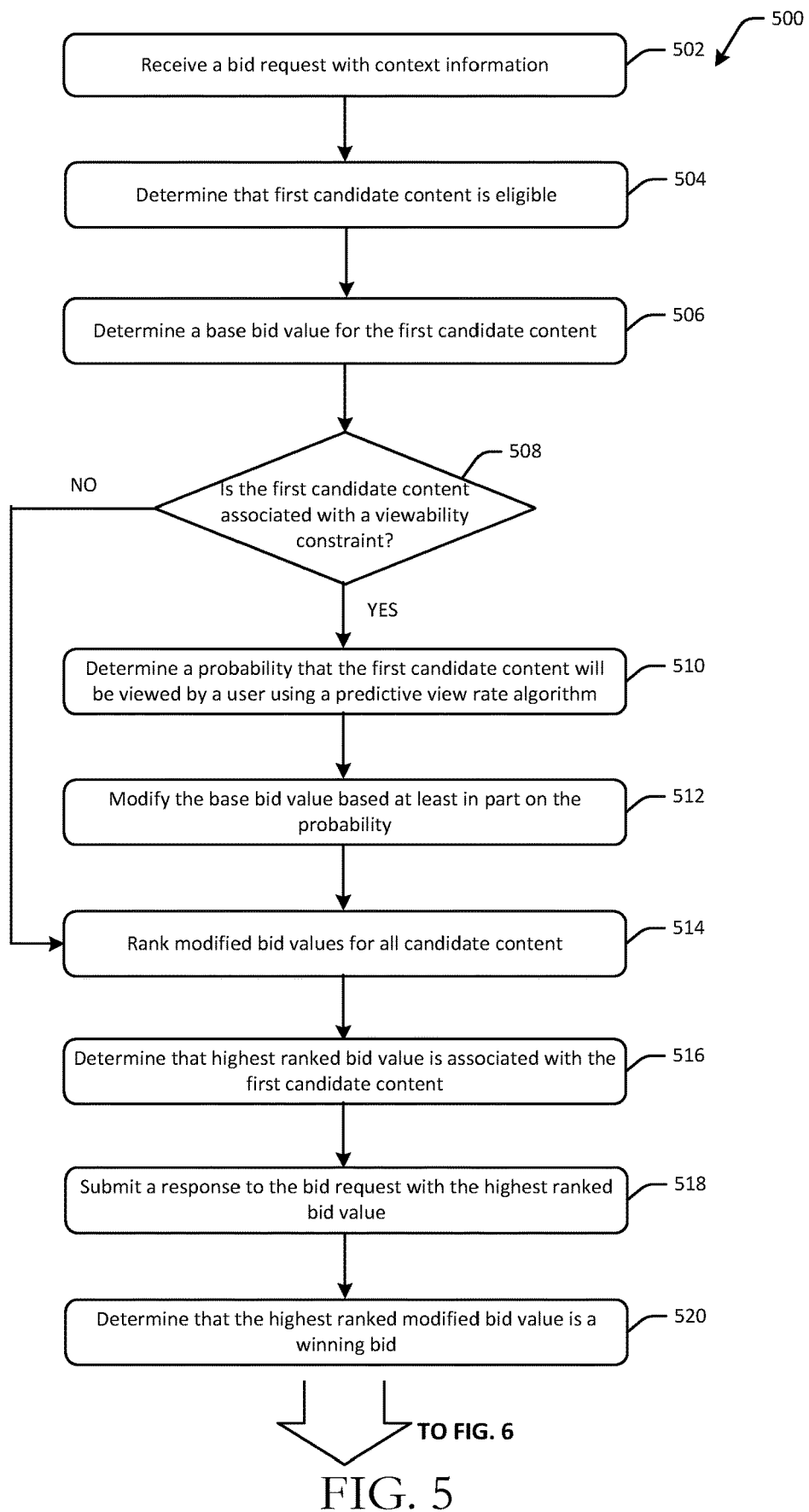
Figure 6:
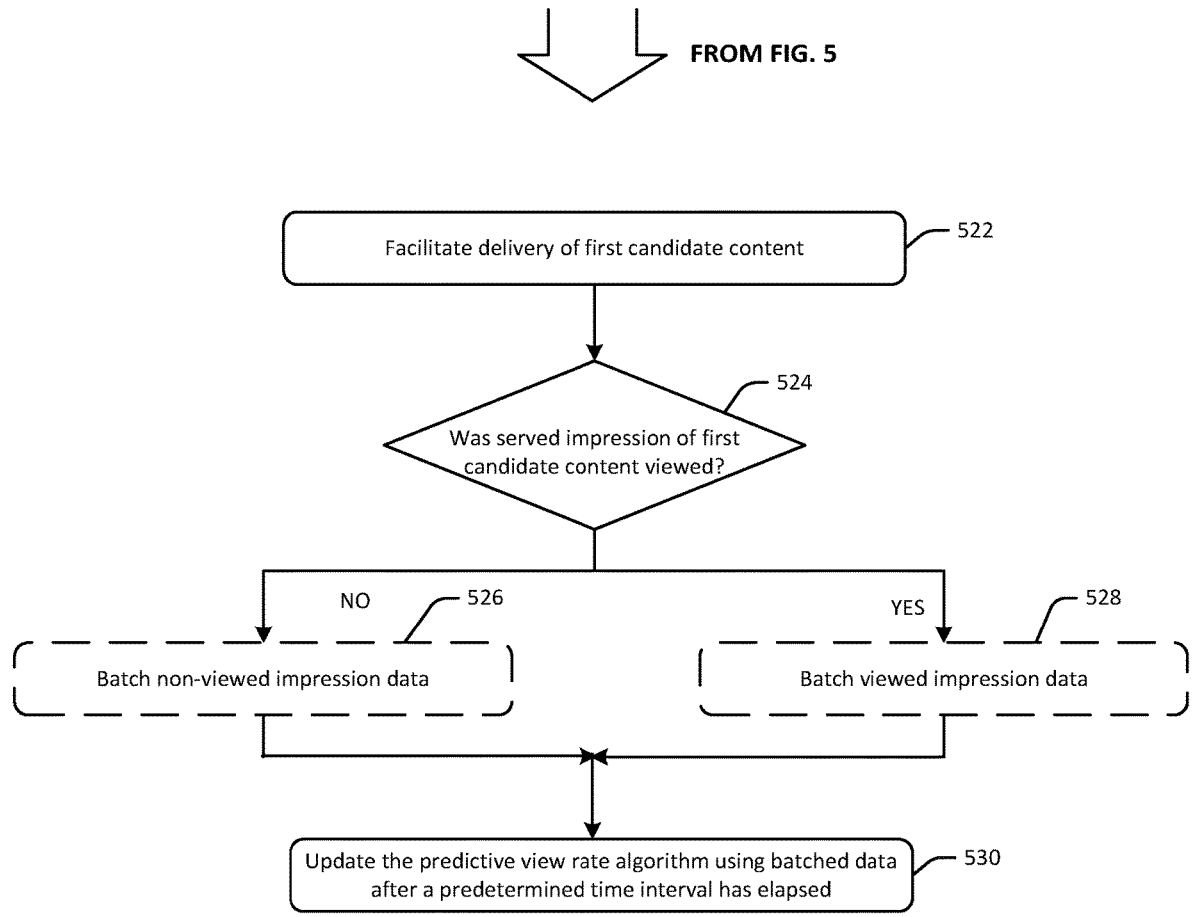

FIGS. 5-6 depict an example process flow 500 for detecting viewability and delivering content using viewability metrics in accordance with one or more embodiments of the disclosure. At block 502 of the process flow 500, a bid request is received with context information. The bid request may be received by one or more computer systems.

At block 504, first candidate content is determined to be eligible. The first candidate content may be determined to be eligible for an available content slot for which the bid request was received. Eligibility may be determined, for example, based on factors such as attributes of the available content slot, device properties, context, or other factors.

At block 506, a base bid value is determined for the first candidate content. The base bid value may be determined based at least in part on an expected value of presenting an impression of the first candidate content at the available content slot.

At determination block 508, a determination is made as to whether the first candidate content is associated with a viewability constraint. The determination may be made, for example, by a viewability constraint module stored at a remote server. If it is determined that the first candidate content is associated with a viewability constraint, the process flow 500 may continue to block 510, at which a probability that the first candidate content will be viewed by a user is determined using a predictive view rate algorithm. At block 512, the first base bid value may be modified based at least in part on the probability. The process flow 500 may then proceed to block 514.

If it is determined at determination block 508 that the first candidate content is not associated with a viewability constraint, the process flow 500 may proceed to block 514. At block 514, modified bid values for all candidate content may be ranked. In some instances, not all bids for candidate content may be modified; in such cases the base bid values for non-modified bids may be ranked together with the modified bid values.

At block 516, the highest ranked bid may be determined to be associated with the first candidate content. At block 518, a response to the bid request may be submitted with the highest ranked bid value. The response may also include an identifier associated with the first candidate content. At block 520, the highest ranked bid as submitted in the response may be determined to be a winning bid. For example, the content delivery server may receive a winning bid notification.

At block 522 of the process flow 500 in FIG. 6, delivery of the first candidate content may be facilitated. For example, creative material associated with the first candidate content may be sent to a user device for presentation at the available content slot.

At determination block 524, a determination is made as to whether the served impression of the first candidate content was viewed. The determination may be made, for example, by a viewed detection module stored at a remote server. The determination may be made at the user device, at a remote server, or by a combination of computer resources thereof. In one example, the determination may be based at least in part on a dwell time at the content impression. A dwell time for content impression may be determined to meet a content consumption threshold. The content consumption threshold may be specific to the content. For example, if the content is a video, the content consumption threshold may be a certain length, such as the length of the video or a portion of the video (e.g., 50% of the length of the video, etc.). If the dwell time is equal to or greater than the content consumption threshold, it may be determined that the user consumed the content. In some embodiments, a remote server may initiate execution of computer-executable instructions at a user device to determine a dwell time at certain content after the content is rendered at the user device. The user device may receive a viewed confirmation notification from the user device indicating that the user consumed the content.

If it is determined that the user did not view the content at determination block 524, the process flow 500 may proceed to optional block 526, at which non-viewed impression data may be batched. For example, for all impressions associated with a campaign during a certain time interval, non-viewed impression data (such as data indicating that an impression was not consumed viewed) may be batched and stored. If it is determined at determination block 524 that the user did view or consume the content, the process flow 500 may proceed to optional block 528, at which viewed impression data may be batched. For example, for all impressions associated with a campaign during a certain time interval, viewed impression data (such as data indicating whether an impression was viewed) may be batched and stored.

At block 530, the predictive view rate algorithm may be updated or modified using the batched data after a predetermined time interval has elapsed. For example, every 20 seconds, the predictive view rate algorithm may be updated via machine learning techniques based at least in part on the batched viewed impression data. The predictive view rate algorithm may be used to determine predictive view rates for subsequent bid requests.

One or more operations of the method, process flows, or use cases of FIGS. 1-6 may have been described above as being performed by a user device, or more specifically, by one or more program module(s), applications, or the like executing on a device. It should be appreciated, however, that any of the operations of methods, process flows, or use cases of FIGS. 1-6 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
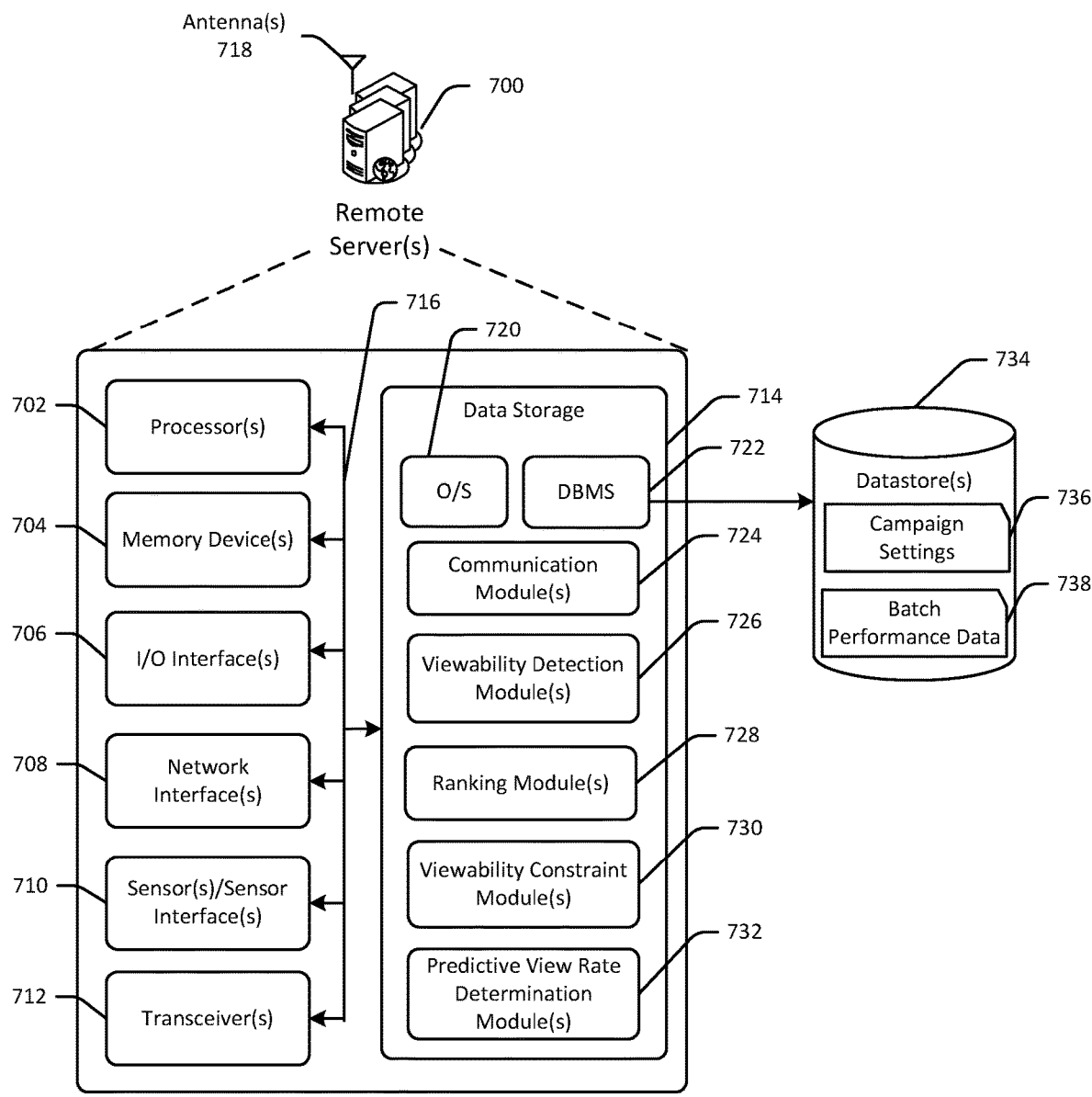
FIG. 7 schematically illustrates an example architecture of a system in accordance with one or more embodiments of the disclosure.

FIG. 7 is a schematic block diagram of one or more illustrative remote server(s) 700 in accordance with one or more example embodiments of the disclosure. The remote server(s) 700 may include any suitable computing device including, but not limited to, a server system, a mobile device such as a smartphone, tablet, e-reader, wearable device, or the like; a desktop computer; a laptop computer; a content streaming device; a set-top box; or the like. The remote server(s) 700 may correspond to an illustrative device configuration for the campaign management servers of FIGS. 1-6.

The remote server(s) 700 may be configured to communicate via one or more networks with one or more servers, user devices, or the like. The remote server(s) 700 may be configured to actively or passively manage one or more aspects of a content campaign, such as content delivery parameters. The remote server(s) 700 may be configured to deliver one or more pieces of content and may further be configured to engage in a bidding process for auctions to present content. In some embodiments, a single remote server or single group of remote servers may be configured to perform more than one type of content delivery functionality.

The remote server(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 700 may include one or more processors (processor(s)) 702, one or more memory devices 704 (generically referred to herein as memory 704), one or more input/output ("I/O") interface(s) 706, one or more network interface(s) 708, one or more sensors or sensor interface(s) 710, one or more transceivers 712, and data storage 714. The remote server(s) 700 may further include one or more buses 716 that functionally couple various components of the remote server(s) 700. The remote server(s) 700 may further include one or more antenna(e) 718 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 716 may include at least one of a system bus, a memory bus, an address bus, or a message bus, and may permit exchange of information (e.g., data (including computer-executable code), signaling, etc.) between various components of the remote server(s) 700. The bus(es) 716 may include, without limitation, a memory bus or a memory controller, a peripheral bus, an accelerated graphics port, and so forth. The bus(es) 716 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 714 may include removable storage and/or non-removable storage including, but not limited to, magnetic storage, optical disk storage, and/or tape storage. The data storage 714 may provide non-volatile storage of computer-executable instructions and other data. The memory 704 and the data storage 714, removable and/or non-removable, are examples of computer-readable storage media (CRSM) as that term is used herein.

The data storage 714 may store computer-executable code, instructions, or the like that may be loadable into the memory 704 and executable by the processor(s) 702 to cause the processor(s) 702 to perform or initiate various operations. The data storage 714 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 714 for non-volatile storage.

More specifically, the data storage 714 may store one or more operating systems (O/S) 720; one or more database management systems (DBMS) 722; and one or more program module(s), applications, engines, computer-executable code, scripts, or the like such as, for example, one or more communication module(s) 724, one or more viewability detection module(s) 726, one or more ranking module(s) 728, one or more viewability constraint module(s) 730, and/or one or more predictive view rate determination module(s) 732. Some or all of these module(s) may be sub-module(s). Any of the components depicted as being stored in data storage 714 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 714 may support functionality described in reference to correspondingly named components earlier in this disclosure.

The data storage 714 may further store various types of data utilized by components of the remote server(s) 700. Any data stored in the data storage 714 may be loaded into the memory 704 for use by the processor(s) 702 in executing computer-executable code. In addition, any data depicted as being stored in the data storage 714 may potentially be stored in one or more datastore(s) and may be accessed via the DBMS 722 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, an example datastore(s) 734 may include, for example, campaign settings 736, batch performance data 738, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the communication module(s) 724 may include computer-executable instructions, code, or the like that responsive to execution by one or more of the processor(s) 702 may perform functions including, but not limited to, communicating with remote servers, communicating with remote datastores, sending or receiving notifications, and the like.

The viewability detection module(s) 726 may include computer-executable instructions, code, or the like that responsive to execution by one or more of the processor(s) 702 may perform functions including, but not limited to, determining whether a content impression was served, determining whether a content impression was viewed, determining pixel location of served content, initiating computer-executable logic at user devices or other remote devices, and the like.

The ranking module(s) 728 may include computer-executable instructions, code, or the like that responsive to execution by one or more of the processor(s) 702 may perform functions including, but not limited to, determining base bid values, determining bid modifiers, determining viewability constraint statuses, and the like.

The viewability constraint module(s) 730 may include computer-executable instructions, code, or the like that responsive to execution by one or more of the processor(s) 702 may perform functions including, but not limited to, identifying viewability constraints, determining viewability constraint compliance, determining shadow prices, and the like.

The predictive view rate determination module(s) 732 may include computer-executable instructions, code, or the like that responsive to execution by one or more of the processor(s) 702 may perform functions including, but not limited to, determining predictive view rates, updating or modifying predictive view rate algorithms, and the like.

Referring now to other illustrative components depicted as being stored in the data storage 714, the O/S 720 may be loaded from the data storage 714 into the memory 704 and may provide an interface between other application software executing on the remote server(s) 700 and hardware resources of the remote server(s) 700. More specifically, the O/S 720 may include a set of computer-executable instructions for managing hardware resources of the remote server(s) 700 and for providing common services to other application programs (e.g., managing memory allocation among various application programs). In certain example embodiments, the O/S 720 may control execution of the other program module(s) to dynamically enhance characters for content rendering. The O/S 720 may include any operating system now known or which may be developed in the future including, but not limited to, any server operating system, any mainframe operating system, or any other proprietary or non-proprietary operating system.

The DBMS 722 may be loaded into the memory 704 and may support functionality for accessing, retrieving, storing, and/or manipulating data stored in the memory 704 and/or data stored in the data storage 714. The DBMS 722 may use any of a variety of database models (e.g., relational model, object model, etc.) and may support any of a variety of query languages. The DBMS 722 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 700 is a mobile device, the DBMS 722 may be any suitable light-weight DBMS optimized for performance on a mobile device.

Referring now to other illustrative components depicted as being stored in the data storage 714, the O/S 720 may be loaded from the data storage 714 into the memory 704 and may provide an interface between other application software executing on the remote server(s) 700 and hardware resources of the remote server(s) 700. More specifically, the O/S 720 may include a set of computer-executable instructions for managing hardware resources of the remote server(s) 700 and for providing common services to other application programs (e.g., managing memory allocation among various application programs). In certain example embodiments, the O/S 720 may control execution of one or more of the program module(s) depicted as being stored in the data storage 714. The O/S 720 may include any operating system now known or which may be developed in the future including, but not limited to, any server operating system, any mainframe operating system, or any other proprietary or non-proprietary operating system.

The DBMS 722 may be loaded into the memory 704 and may support functionality for accessing, retrieving, storing, and/or manipulating data stored in the memory 704 and/or data stored in the data storage 714. The DBMS 722 may use any of a variety of database models (e.g., relational model, object model, etc.) and may support any of a variety of query languages. The DBMS 722 may access data represented in one or more data schemas and stored in any suitable data repository. In certain example embodiments, the DBMS 722 may be any suitable light-weight DBMS optimized for performance on a mobile device.

Referring now to other illustrative components of the remote server(s) 700, the input/output (I/O) interface(s) 706 may facilitate the receipt of input information by the remote server(s) 700 from one or more I/O devices as well as the output of information from the remote server(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 718 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The remote server(s) 700 may further include one or more network interface(s) 708 via which the remote server(s) 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 718 may include any suitable type of antenna depending, for example, on the communications protocols used to transmit or receive signals via the antenna (e) 718. Non-limiting examples of suitable antennas may include directional antennas, non-directional antennas, dipole antennas, folded dipole antennas, patch antennas, multiple-input multiple-output (MIMO) antennas, or the like. The antenna(e) 718 may be communicatively coupled to one or more transceivers 712 or radio components to which or from which signals may be transmitted or received.

As previously described, the antenna(e) 718 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 718 may additionally, or alternatively, include a Wi-Fi antenna configured to transmit or receive signals in accordance with established standards and protocols, such as the IEEE 1002.11 family of standards, including via 2.4 GHz channels (e.g. 1002.11b, 1002.11g, 1002.11n), 5 GHz channels (e.g. 1002.11n, 1002.11ac), or 60 GHZ channels (e.g. 1002.11ad). In alternative example embodiments, the antenna(e) 718 may be configured to transmit or receive radio frequency signals within any suitable frequency range forming part of the unlicensed portion of the radio spectrum.

The antenna(e) 718 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 718—transmitting or receiving radio frequency (RF) signals in the bandwidth and/or channels corresponding to the communications protocols utilized by the remote server(s) 700 to communicate with other devices. The transceiver(s) 712 may include hardware, software, and/or firmware for modulating, transmitting, or receiving—potentially in cooperation with any of antenna(e) 718—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 7 as being stored in the data storage 714 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server(s) 700 may include alternate and/or additional hardware, software, or firmware components beyond those described or depicted without departing from the scope of the disclosure. More particularly, it should be appreciated that software, firmware, or hardware components depicted as forming part of the remote server(s) 700 are merely illustrative and that some components may not be present or additional components may be provided in various embodiments. While various illustrative program module(s) have been depicted and described as software module(s) stored in data storage 714, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6 may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD- ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to at least one memory, a bid request for an available content delivery slot at a first user interface, the bid request comprising context information;
determining first content for presentation at the available content delivery slot;
determining a first base bid value for the first content;
generating, using a predictive model, a probability that the first content will be consumed based at least in part on the context information, wherein the probability is an estimated view rate indicative of a likelihood the first content will be viewed by a user;
determining an estimated cost associated with delivery of an impression of the first content at the available content delivery slot;
determining a first bid modifier using the estimated view rate and the estimated cost;
sending a response to the bid request comprising a first bid amount, wherein the first bid amount is based at least in part on the first base bid value and the first bid modifier;
initiating execution of computer-executable instructions at a user device to:
determine a first dwell time associated with second content presented at a second user interface at the user device, wherein the second content is presented prior to the impression of the first content;
determine a first number of words presented at the second user interface;
determine a second dwell time associated with the first content after the impression of the first content is rendered at the first user interface at the user device;
determine a second number of words presented at the first user interface; and
transmit representative data to the one or more computer processors;
determining that the first number of words is greater than the second number of words;
determining that the first dwell time is less than or is close to the second dwell time;
determining that the impression of the first content was viewed by the user based at least in part on the determination that the first number of words is greater than the second number of words and the first dwell time is less than or is close to the second dwell time; and
updating the predictive model based at least in part on the determining that the impression of the first content was viewed by the user.

2. The method of claim 1, further comprising:
determining that the first content is associated with a content delivery campaign having a viewability constraint, the viewability constraint comprising a target cost per viewed content impression; and
determining a difference between an average cost per viewed content impression for the content delivery campaign and the target cost per viewed content impression;
wherein determining the first bid modifier using the estimated view rate and the estimated cost comprises determining the first bid modifier using the estimated view rate, the estimated cost, and the difference.

3. The method of claim 1, further comprising:
determining third content for the available content delivery slot;
determining a second base bid value for the third content;
determining a second bid modifier;
determining a second bid amount for the third content using the second base bid value and the second bid modifier; and
ranking the first bid amount and the second bid amount.

4. The method of claim 3, further comprising:
determining that the first bid amount is greater than the second bid amount.

5. The method of claim 1, further comprising:
determining that the first bid amount is a winning bid amount; and
initiating delivery of the impression of the first content to the user device.

6. The method of claim 5, further comprising:
determining that the second dwell time for the impression meets a content consumption threshold; and
determining that the user consumed the impression based at least in part on the second dwell time.

7. The method of claim 5, further comprising:
determining a first average cost per viewed content impression for a content delivery campaign;
determining that a predetermined time interval has elapsed;
determining a second average cost per viewed content impression for the content delivery campaign; and
determining a difference between the second average cost per viewed impression for the content delivery campaign and a target cost per viewed content impression for the content delivery campaign.

8. The method of claim 7, wherein the bid request is a first bid request, the method further comprising:
receiving a second bid request;
determining a third base bid for the first content; and
determining a third bid modifier for the first content using the difference.

9. A device comprising:
at least one memory that stores computer-executable instructions; and
at least one processor configured to access the at least one memory and execute the computer-executable instructions to:
receive a bid request for an available content delivery slot at a first user interface, the bid request comprising context information;
determine first content for presentation at the available content delivery slot;
determine a first base bid value for the first content;
generate, using a predictive model, a probability that the first content will be consumed based at least in part on the context information, wherein the probability is an estimated view rate indicative of a likelihood the first content will be viewed by a user;
determine a first bid modifier using the estimated view rate;
send a response to the bid request comprising a first bid amount, wherein the first bid amount is based at least in part on the first base bid value and the first bid modifier;
initiate execution of computer-executable instructions at a user device to:
determine a first dwell time associated with second content presented at a second user interface at the user device, wherein the second content is presented prior to the impression of the first content;
determine a first number of words presented at the second user interface;
determine a second dwell time at the first content after the impression of the first content is rendered at the first user interface at the user device; and
determine a second number of words presented at the first user interface;
receive a notification from the user device, wherein the notification comprises the first dwell time, the first number of words, the second dwell time, and the second number of words;
determine that the first number of words is greater than the second number of words;
determine that the first dwell time is less than or is close to the second dwell time;
determine that the impression of the first candidate content was viewed by the user based at least in part on the determination that the first number of words is greater than the second number of words and the first dwell time is less than or is close to the second dwell time; and
update the predictive model based at least in part on the determining that the impression of the first content was viewed by the user.

10. The device of claim 9, wherein the at least one processor is further configured to access the at least one memory and execute the computer-executable instructions to:
determine that the first content is associated with a content delivery campaign having a viewability constraint, the viewability constraint comprising a target cost per viewed content impression; and
determine a difference between an average cost per viewed content impression for the content delivery campaign and the target cost per viewed content impression;
wherein the at least one processor is configured to determine the first bid modifier using the estimated view rate by executing the computer-executable instructions to determine the first bid modifier using the estimated view rate and the difference.

11. The device of claim 9, wherein the at least one processor is further configured to access the at least one memory and execute the computer-executable instructions to:
determine third content for the available content delivery slot;
determine a second base bid value for the third content;
determine a second bid modifier;
determine a second bid amount for the third content using the second base bid value and the second bid modifier; and
rank the first bid amount and the second bid amount.

12. The device of claim 9, wherein the at least one processor is further configured to access the at least one memory and execute the computer-executable instructions to:
determine that the first bid amount is a winning bid amount; and
initiate delivery of the impression of the first content to the user device.

13. The device of claim 12, wherein the at least one processor is configured to determine that the user consumed the impression of the first content by executing the computer-executable instructions to:
determine that the second dwell time for the impression meets a content consumption threshold; and
determine that the user consumed the impression of the first content based at least in part on the second dwell time.

14. A non-transitory computer-readable medium storing computer-executable instructions which when executed by one or more processors of a device result in performing operations comprising:
receiving, by one or more computer processors coupled to at least one memory, a bid request for an available content delivery slot at a first user interface, the bid request comprising context information;
determining first content for presentation at the available content delivery slot;
determining a first base bid value for the first content;
generating, using a predictive model, a probability that the first content will be consumed based at least in part on the context information, wherein the probability is an estimated view rate indicative of a likelihood the first content will be viewed by a user;
determining an estimated cost associated with delivery of an impression of the first content at the available content delivery slot;
determining a first bid modifier using the estimated view rate and the estimated cost;
sending a response to the bid request comprising a first bid amount, wherein the first bid amount is based at least in part on the first base bid value and the first bid modifier;
initiating execution of computer-executable instructions at a user device to:
determine a first dwell time associated with second content presented at a second user interface at the user device, wherein the second content is presented prior to the impression of the first content;
determine a first number of words presented at the second user interface;

determine a second dwell time associated with the first content after the impression of the first content is rendered at the first user interface at the user device;

determine a second number of words presented at the first user interface; and transmit representative data to the device;

determining that the first number of words is greater than the second number of words;

determining that the first dwell time is less than or is close to the second dwell time;

determining that the impression of the first content was viewed by the user based at least in part on the determination that the first number of words is greater than the second number of words and the first dwell time is less than or is close to the second dwell time; and updating the predictive model based at least in part on the determining that the impression of the first content was viewed by the user.

15. The non-transitory computer-readable medium of claim 14, wherein the operations further comprise:

determining that the first content is associated with a content delivery campaign having a viewability constraint, the viewability constraint comprising a target cost per viewed content impression; and determining a difference between an average cost per viewed content impression for the content delivery campaign and the target cost per viewed content impression;

wherein determining the first bid modifier using the estimated view rate and the estimated cost comprises determining the first bid modifier using the estimated view rate, the estimated cost, and the difference.

16. The non-transitory computer-readable medium of claim 14, wherein the operations further comprise:

determining third content for the available content delivery slot;

determining a second base bid value for the third content;

determining a second bid modifier;

determining a second bid amount for the third content using the second base bid value and the second bid modifier; and ranking the first bid amount and the second bid amount.

17. The non-transitory computer-readable medium of claim 14, wherein the operations further comprise:

determining that the first bid amount is a winning bid amount; and initiating delivery of the impression of the first content to the user device.

* * * * *